United States Patent
Feng et al.

(10) Patent No.: US 12,381,603 B2
(45) Date of Patent: Aug. 5, 2025

(54) MILLIMETER WAVE (MMW) DOWNLINK MULTIPLE INPUT MULTIPLE OUTPUT (MIMO) AND CARRIER AGGREGATION (CA) ARCHITECTURE

(71) Applicant: QUALCOMM INCORPORATED, San Diego, CA (US)

(72) Inventors: Yunfei Feng, San Diego, CA (US); Li Liu, San Diego, CA (US); Gurkanwal Singh Sahota, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/069,899

(22) Filed: Dec. 21, 2022

(65) Prior Publication Data
US 2024/0214037 A1 Jun. 27, 2024

(51) Int. Cl.
*H04B 7/0426* (2017.01)

(52) U.S. Cl.
CPC .................. *H04B 7/0426* (2013.01)

(58) Field of Classification Search
CPC .......... H04B 7/02; H04B 7/04; H04B 7/0413; H04B 7/0426; H04B 7/0456; H04B 7/406; H04B 7/0469; H04B 7/10; H04B 7/08; H04B 7/0837; H04B 7/084
See application file for complete search history.

(56) References Cited

U.S. PATENT DOCUMENTS

| | | | | |
|---|---|---|---|---|
| 8,649,418 B1* | 2/2014 | Negus | ...................... | H04B 7/08 375/211 |
| 8,923,381 B2* | 12/2014 | Rilling | .................... | H04L 27/38 375/147 |
| 9,154,243 B2* | 10/2015 | Fernando | ............... | H04B 17/21 |
| 9,444,534 B2* | 9/2016 | Khan | .................... | H04B 7/0408 |
| 9,445,282 B2* | 9/2016 | Chen | ......................... | H01Q 3/38 |
| 9,473,336 B2* | 10/2016 | Pan | .......................... | H04B 7/26 |
| 9,813,269 B1* | 11/2017 | Yoon | ........................ | H04B 1/40 |
| 10,020,865 B2* | 7/2018 | Mu | ......................... | H01Q 3/40 |
| 10,181,964 B2* | 1/2019 | Yum | ..................... | H04B 17/345 |
| 10,439,851 B2* | 10/2019 | Novak | ..................... | H01Q 3/42 |

(Continued)

FOREIGN PATENT DOCUMENTS

WO 2019221670 A1 11/2019

*Primary Examiner* — James M Perez
(74) *Attorney, Agent, or Firm* — Smith Tempel Blaha LLC/Qualcomm Incorporated

(57) ABSTRACT

A receive system for performing carrier aggregation (CA) and multiple input multiple output (MIMO) operation at millimeter wave (mmW) frequencies includes a phased array having a plurality of groupings, each grouping having a pair of sub array structures, each sub array structure having a mixer and a plurality of phased array elements, each phased array element associated with an antenna element, each phased array element having an amplifier (LNA) and a phase shift circuitry, and an amplifier array associated with each grouping, the amplifier array having two pairs of amplifiers, wherein a first amplifier of each pair is coupled to a first port and a second amplifier of each pair is coupled to a second port, the amplifier array configured to selectively route an output from any of the sub array structures of a grouping to either of the first and second ports.

19 Claims, 13 Drawing Sheets

(56) References Cited

U.S. PATENT DOCUMENTS

| | | | | |
|---|---|---|---|---|
| 10,505,602 B1* | 12/2019 | Khan | | H04B 7/0456 |
| 10,694,399 B1* | 6/2020 | Tran | | H01Q 3/01 |
| 11,271,699 B1* | 3/2022 | Eyuboglu | | H04L 1/1819 |
| 11,303,316 B2* | 4/2022 | Choi | | H04B 7/0413 |
| 11,411,641 B2* | 8/2022 | Hormis | | H04B 7/086 |
| 11,742,931 B2* | 8/2023 | Ashworth | | H04B 7/15535 |
| | | | | 455/7 |
| 11,881,929 B2* | 1/2024 | Hormis | | H04B 7/086 |
| 11,901,977 B2* | 2/2024 | Al-Mahdawi | | H04B 7/0617 |
| 12,088,367 B2* | 9/2024 | Han | | H04B 7/0408 |
| 2013/0142136 A1* | 6/2013 | Pi | | H04B 7/15507 |
| | | | | 370/329 |
| 2013/0202054 A1* | 8/2013 | Khan | | H04B 7/0617 |
| | | | | 375/259 |
| 2013/0223251 A1* | 8/2013 | Li | | H04B 7/0689 |
| | | | | 370/252 |
| 2016/0014705 A1* | 1/2016 | Tani | | H04B 1/1036 |
| | | | | 370/252 |
| 2016/0087335 A1* | 3/2016 | Marr | | H04B 7/0617 |
| | | | | 342/368 |
| 2017/0318589 A1* | 11/2017 | Negus | | H04B 7/04 |
| 2017/0366242 A1* | 12/2017 | Lee | | H01Q 3/24 |
| 2018/0040964 A1* | 2/2018 | Benjebbour | | H01Q 3/26 |
| 2018/0175797 A1* | 6/2018 | Lee | | H03G 1/0088 |
| 2018/0183509 A1* | 6/2018 | Luo | | H04B 7/01 |
| 2018/0219587 A1* | 8/2018 | Huo | | H04B 1/40 |
| 2018/0248676 A1* | 8/2018 | Raggio | | H04B 7/15542 |
| 2018/0269576 A1* | 9/2018 | Scarborough | | H01Q 3/46 |
| 2018/0351619 A1* | 12/2018 | Khan | | H04B 7/0897 |
| 2019/0028153 A1* | 1/2019 | Suyama | | H01Q 3/2652 |
| 2019/0089434 A1* | 3/2019 | Rainish | | H04B 7/086 |
| 2019/0361088 A1* | 11/2019 | Bajor | | H04B 7/0617 |
| 2020/0099144 A1* | 3/2020 | Liu | | H01Q 21/30 |
| 2020/0106473 A1* | 4/2020 | Rong | | H04B 1/40 |
| 2020/0336168 A1* | 10/2020 | Hormis | | H03L 7/22 |
| 2020/0367257 A1* | 11/2020 | Hormis | | H04B 7/155 |
| 2020/0382208 A1* | 12/2020 | Hormis | | H04B 7/043 |
| 2020/0389228 A1* | 12/2020 | Ashworth | | H04B 7/15535 |
| 2021/0099222 A1* | 4/2021 | Hwang | | H04B 7/086 |
| 2021/0168003 A1* | 6/2021 | Norris | | H04L 5/0016 |
| 2021/0218426 A1* | 7/2021 | Chen | | H04B 1/04 |
| 2021/0250057 A1* | 8/2021 | Choi | | H04B 7/0413 |
| 2021/0266052 A1* | 8/2021 | Fernando | | H04B 3/54 |
| 2021/0351816 A1* | 11/2021 | Raghavan | | H04L 5/0023 |
| 2022/0038142 A1* | 2/2022 | Abu-Surra | | H01Q 1/2283 |
| 2022/0039191 A1* | 2/2022 | Raghavan | | H04W 36/305 |
| 2022/0045744 A1* | 2/2022 | Anderson | | H04B 7/155 |
| 2022/0107408 A1* | 4/2022 | Kohtani | | G01S 13/931 |
| 2022/0209836 A1* | 6/2022 | Kovacic | | H01Q 21/065 |
| 2023/0033880 A1* | 2/2023 | Hormis | | H04B 7/0456 |
| 2023/0309187 A1* | 9/2023 | Maki | | H04L 27/2602 |
| 2024/0204806 A1* | 6/2024 | Feng | | H04B 1/0067 |
| 2024/0214037 A1* | 6/2024 | Feng | | H04B 7/0413 |
| 2025/0031085 A1* | 1/2025 | Rahman | | H04L 5/0051 |

\* cited by examiner

MILLIMETER WAVE (MMW) DOWNLINK MULTIPLE INPUT MULTIPLE OUTPUT (MIMO) AND CARRIER AGGREGATION (CA) ARCHITECTURE

FIELD

The present disclosure relates generally to electronics, and more specifically to wireless communication systems, and more particularly to wireless communication devices having multiple input and multiple output (MIMO) and carrier aggregation (CA) capability.

BACKGROUND

Wireless communication devices and technologies are becoming ever more prevalent as are communication systems that operate at millimeter-wave (mmW) and at near-mmW frequencies. Some communication methodologies use what is referred to as multiple input multiple output (MIMO) and also use carrier aggregation (CA), where multiple signals at one or more frequencies are processed simultaneously.

A 5G mmW communication system may be implemented that generally uses a time domain duplex (TDD) communication methodology. For a TDD system, it is important to maintain synchronicity and prevent interference, which can be challenging when switching between transmit mode and receive mode. Guard periods are used to provide isolation between transmit and receive events, with a configurable total guard time expressed as an integer number of symbols.

At a receiver in a user equipment (UE), the relative frame timing alignment is an important metric. The third generation partnership project (3GPP) has defined a maximum receive timing difference (MRTD) as a maximum relative receive timing difference that the UE must be capable of handling. The MRTD comprises a base-station relative time alignment error (TAE) and an RF propagation delay difference (ΔTprop). That is, MRTD=TAE+ΔTprop. For example, in a known 5G communication system that implemented a single 5 GHz wide downlink channel bandwidth with common beam management (CMB) to realize carrier-aggregation, the MRTD can be as stringent as 0.26 usec. Other limitations and performance degradation arises from this arrangement due to the extreme wideband channel bandwidth.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a receive system for performing carrier aggregation (CA) and multiple input multiple output (MIMO) operation at millimeter wave (mmW) frequencies, including a phased array having quadrants, each quadrant having a pair of sub array structures, each sub array structure having a mixer and a plurality of phased array elements, each phased array element associated with an antenna element, each phased array element having an amplifier (LNA) and a phase shifter (PS), and an amplifier array associated with each quadrant, the amplifier array having two pairs of amplifiers, wherein a first amplifier of each pair is coupled to a first port and a second amplifier of each pair is coupled to a second port, the amplifier array configured to selectively route an output from any of the sub array structures of a quadrant to either of the first and second ports.

Another aspect of the disclosure provides a method for signal processing, including receiving at least two radio frequency (RF) signals at a receiver, simultaneously the at least two RF signals to intermediate frequency (IF) signals, and selectively routing the at least two IF signals to a selected output port.

Another aspect of the disclosure provides a device including means for receiving at least two radio frequency (RF) signals at a receiver, means for downconverting simultaneously the at least two RF signals to intermediate frequency (IF) signals, and means for selectively routing the at least two IF signals to a selected output port.

Another aspect of the disclosure provides a radio system architecture, including a receiver having multiple sub arrays in a phased array, the multiple sub arrays configured to perform carrier aggregation (CA) and multiple input multiple output (MIMO) signal processing while providing independent communication beam management for each of the multiple sub arrays.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

A communication device may include a phased array antenna system and may include receive (Rx) MIMO capability. For example, a 5G New Radio (NR) communication device may support multiple transmitters, multiple receivers and be capable of communication on multiple communication bands. In some examples, the communication device may also include carrier aggregation (CA) where it may simultaneously communicate on multiple communication bands.

Figure 1:
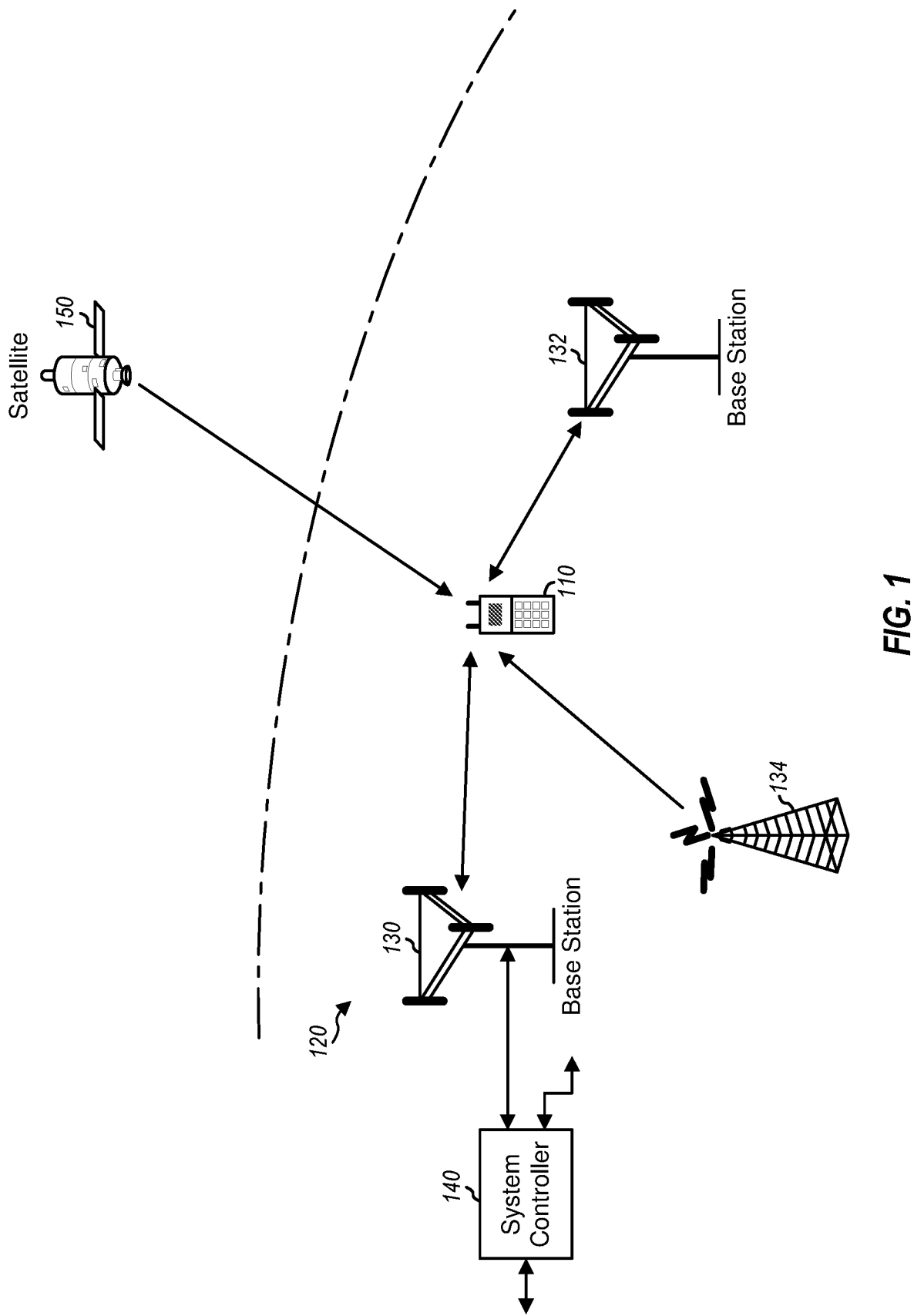
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS)), etc). Wireless device 110 may support one or more radio technologies for wireless communication such as LTE, WCDMA, CDMA 1X, EVDO, TD-SCDMA, GSM, 802.11, 5G, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies.

Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
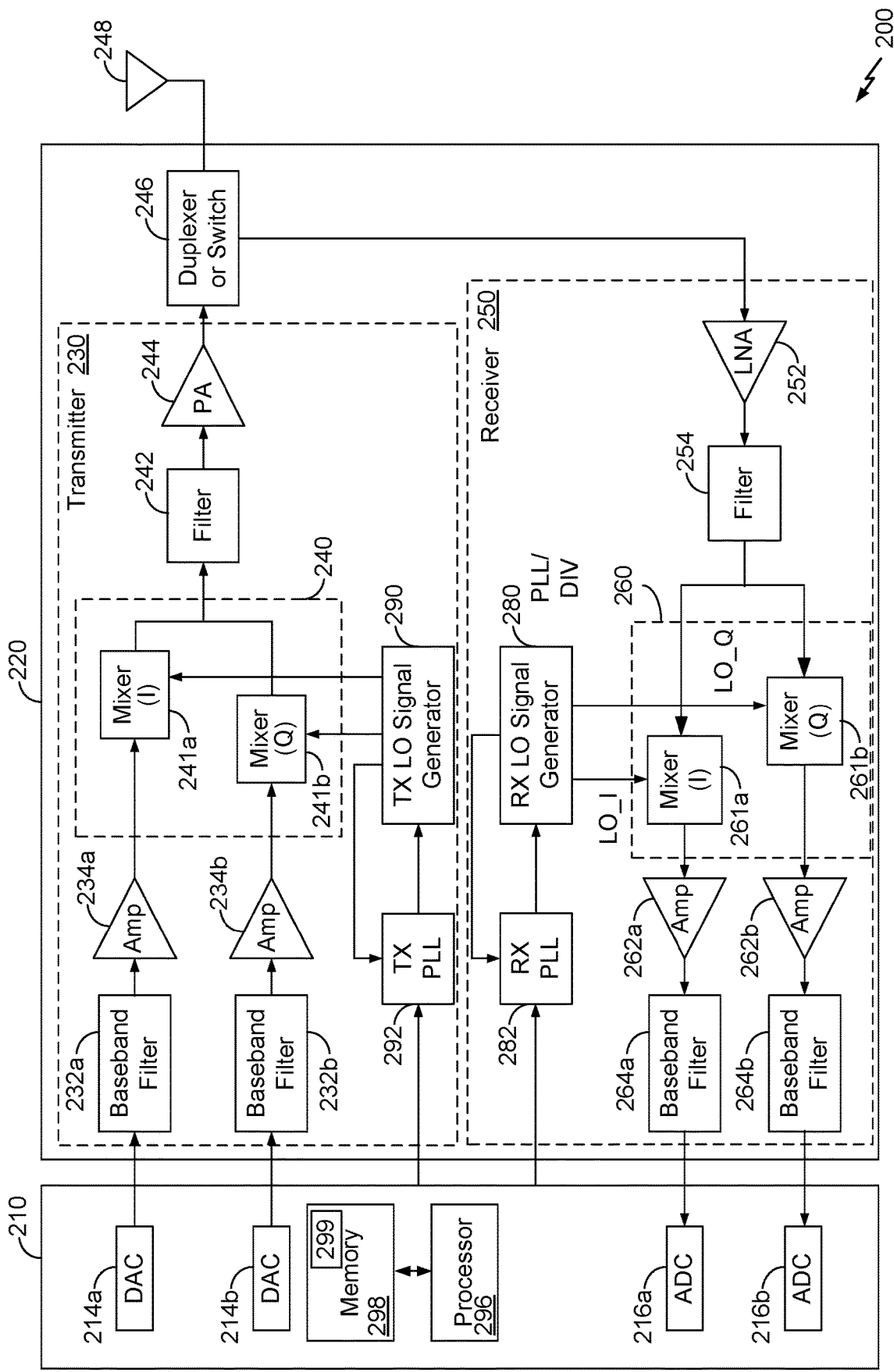
FIG. 2A is a block diagram showing a wireless device in which exemplary techniques of the present disclosure may be implemented.

FIG. 2A is a block diagram showing a wireless device 200 in which the exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250, for example phase shifters as discussed further below. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, lowpass filters 232a and 232b filter the I and Q analog transmit signals, respectively, to remove undesired images caused by the prior digital-toanalog conversion. Amplifiers (Amp) 234a and 234b amplify the signals from lowpass filters 232a and 232b, respectively, and provide I and Q baseband signals.

An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal is routed through a duplexer or switch 246 and transmitted via an antenna 248, or alternatively it can be sent to a separate transmit antenna different from a separate receive antenna. While examples discussed herein utilize I and Q signals, those of skill in the art will understand that components of the transceiver may be configured to utilize polar modulation.

In the receive path, antenna 248 receives communication signals and provides a received RF signal, which can be routed through duplexer or switch 246 and provided to a low noise amplifier (LNA) 252. The duplexer 246 is designed to operate with a specific RX-to-TX duplexer frequency separation, such that RX signals are isolated from TX signals. Alternatively, there may be a separate transmit antenna and separate receive antenna as mentioned above, in which case RX-to-TX isolation can be achieved through the limited coupling between the two antennas. In the case of separate RX and TX antennas, the RX antenna can be coupled directly to LNA 252. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by lowpass filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the filter 242, PA 244, LNA 252 and filter 254 may be implemented separately from other components in the transmitter 230 and receiver 250, and may be implemented on a millimeter wave integrated circuit. An example super-heterodyne architecture is illustrated in FIG. 2B.

Figure 2B:
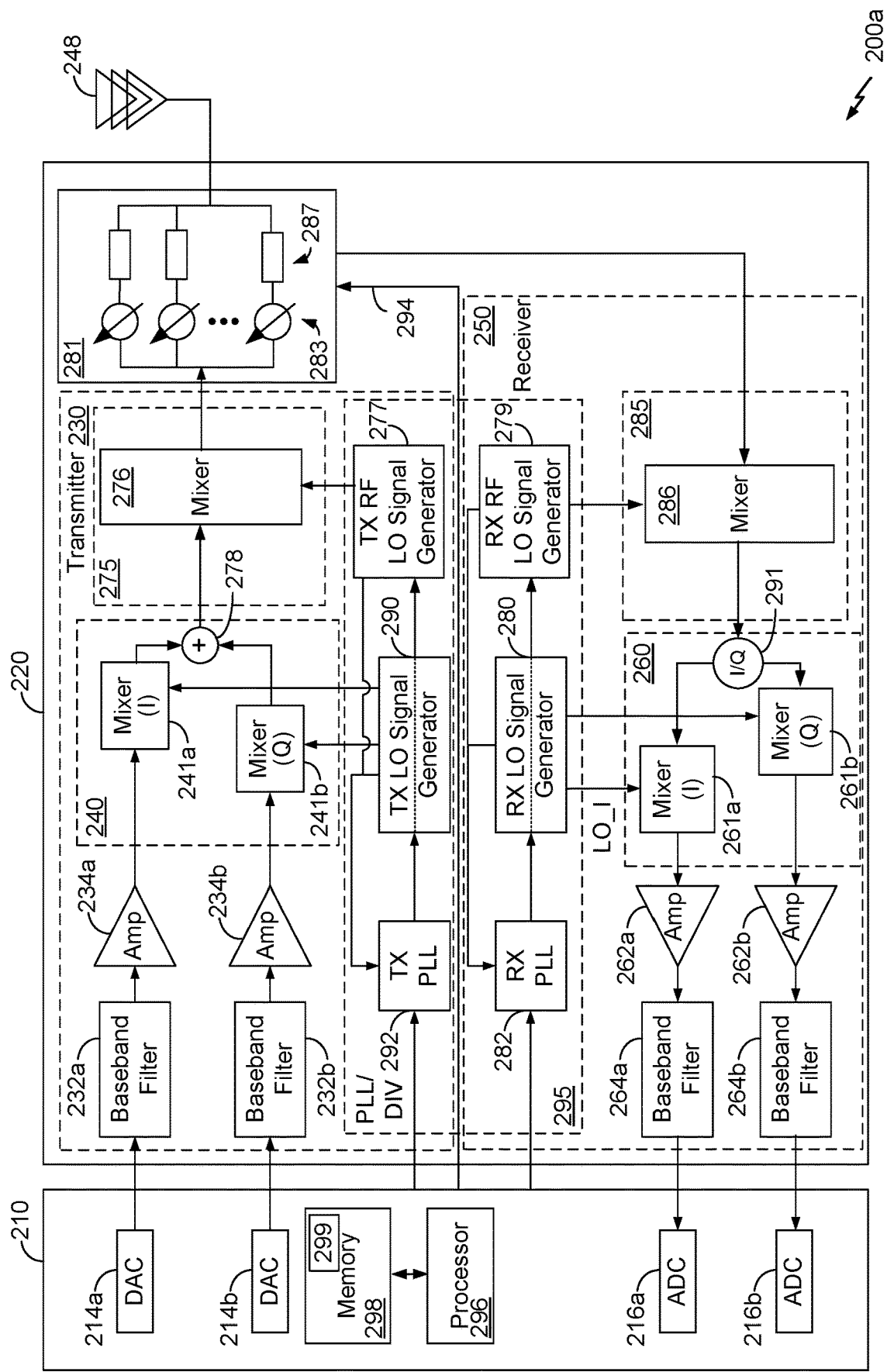
FIG. 2B is a block diagram showing a wireless device in which exemplary techniques of the present disclosure may be implemented.

FIG. 2B is a block diagram showing a wireless device in which the exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise upconversion mixer 276. The summing function 278 of upconverter 240 combines the I and the Q outputs and provides a combined signal to the mixer 276. The combined signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 of downconverter 260 receives the IF signal from the mixer 286 and generates I and Q signals in downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 7.5 GHz (e.g., the FR1 frequency band) using the architecture illustrated in FIG. 2A and to communicate with signals having a frequency above about 24 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B.

Figure 3:
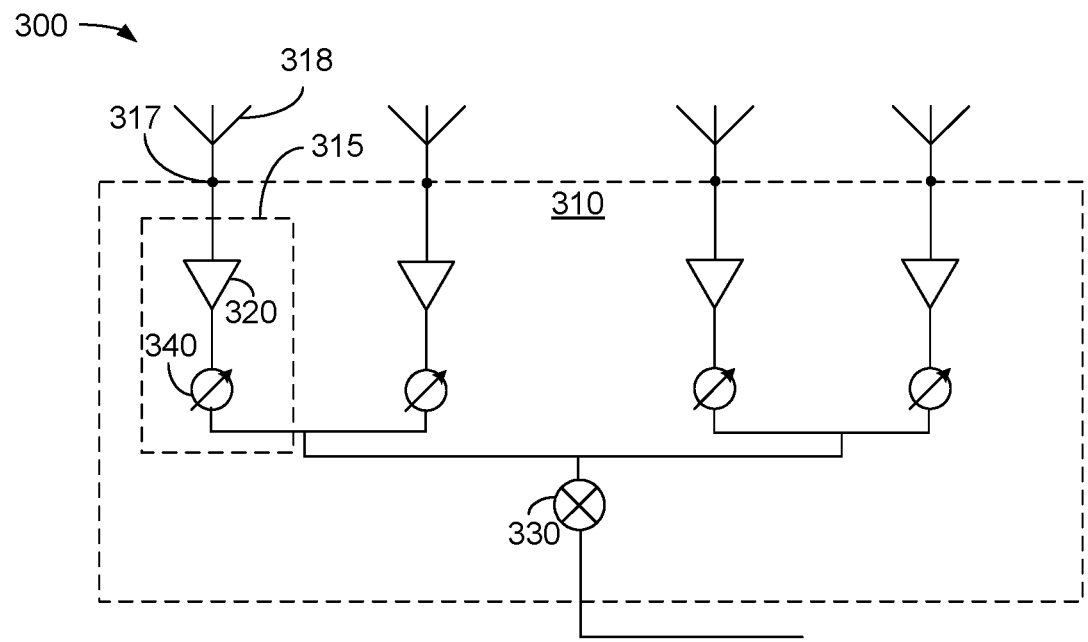
FIG. 3 shows a schematic diagram of a sub array structure of a phased array.

FIG. 3 shows a schematic diagram 300 of a sub array structure 310 of a phased array. The sub array structure 310 may be an example of one of a number of sub array structures that may be located in a phased array circuit, such as the phased array circuit 281 (FIG. 2B). In an exemplary embodiment, there may be 8 sub array structures in a phased array. The sub array structure 310 may comprise a number of phased array elements having transmit and/or receive capability. In an exemplary embodiment, an example receive phased array element 315 may comprise receive circuitry having a low noise amplifier (LNA) 320 and a phase shifter 340. The phased array element 315 may be an example of a phased array element 287 or an example of a portion of the phased array element (for example, a receive portion of a phased array element 287 that includes both transmit and receive components). It will be understood that additional components may be included in the phased array element 315, such one or more filters, additional amplifiers or amplification stages, one or more transformers or baluns or coupling components, one or more switches, etc.

In an exemplary embodiment, the sub array structure 310 may also comprise a mixer 330 connected to the output of each phase shifter 340. Each LNA 320 may be connected to a port 317. In a receive application, the port 317 may comprise one or more outputs of an antenna or an antenna element. An exemplary antenna element 318 is shown for reference. The antenna element 318 may be one antenna element of an array of antenna elements. An antenna system in a phased array may have a plurality of antennas each including one or more antenna elements and may have a plurality of outputs. An example of outputs from an antenna or an antenna element 318 may include a vertical polarization (V pol) output and a horizontal polarization (H pol) output. While H and V terminology are used herein, it will be understood that such description applies to any two (e.g., approximately perpendicular) polarizations of an antenna, such as slant polarizations. In an exemplary embodiment, the mixer 330 may be configured to convert a radio frequency (RF) signal from the port 317 to a lower frequency, referred to as an intermediate frequency (IF). For example, the mixer 330 may be configured to convert a signal at 24 GHz or 39 GHz from the port 317 to a frequency of, for example, 10-14 GHz. Other frequencies are possible. Phase shifted signals from the phased array elements 315 in the sub array structure 310 may be combined prior to being downconverted by the mixer 330. In other examples, a phase shifted signal from each phased array element 315 is respectively downconverted (e.g., by respective downconverters, not illustrated) and may thereafter be combined in some configurations. While the phase shifters 340 are illustrated as being signal path phase shifters, other examples include LO-path phase shifting, for example when respective mixers for each phased array element 315 are implemented.

Figure 4:
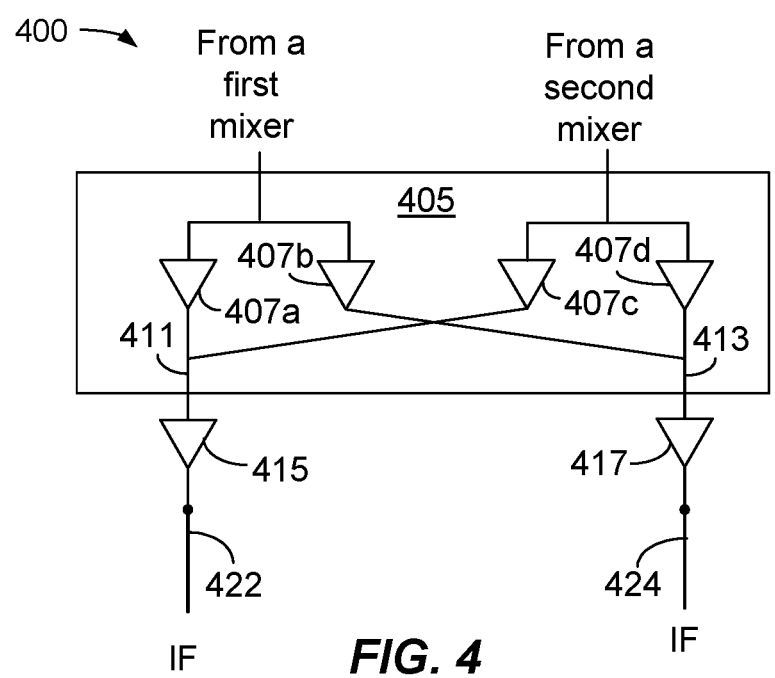
FIG. 4 shows a schematic diagram of a programmable diverting amplifier array.

FIG. 4 shows a schematic diagram 400 of a programmable diverting amplifier array 405, which will also be referred to as an amplifier array. An amplifier array 405 may comprise amplifiers 407, which may be configured as variable gain amplifiers (VGAs), and in an exemplary embodiment may be intermediate frequency (IF) VGAs. The amplifiers 407 may be individually and selectively controlled. For example, one or more of the amplifiers 407 may be on while one or more of the amplifiers 407 may be off, and the gain of each amplifier may be independently adjusted. In an exemplary embodiment, the amplifier array 405 may comprise amplifiers 407a, 407b, 407c and 407d. In an exemplary embodiment, an output of the amplifier 407a and 407c may be provided over connection 411 (and may be combined at the connection 411, or multiplexed or conveyed over separate traces of the connection 411), and an output of the amplifier 407b and 407d may be provided over connection 413 (and may be combined at the connection 413, or multiplexed or conveyed over separate traces of the connection 413). In an exemplary embodiment, an amplifier 415 may be connected to the connection 411 and an amplifier 417 may be connected to the connection 413.

An input of amplifiers 407a and 407b may be coupled to an output of a first mixer, for example a mixer 330 in a first sub array structure 310 of a plurality of sub array structures. An input of amplifiers 407c and 407d may be coupled to an output of a second mixer, for example a mixer 330 in a second sub array structure 310 of a plurality of sub array structures.

An output of the amplifier 415 may be provided over connection 422 and an output of the amplifier 417 may be provided over connection 424. Thus, outputs from the first and second mixers may be selectively provided to connection 422 and/or 424. The signals on connections 422 and 424 may be IF signals in some configurations. In other configurations, the mixer 330 is configured to directly convert RF signals to baseband or near baseband frequencies, and thus the signals on connections 422 and 424 may be baseband or near baseband signals in some configurations.

Figure 5:
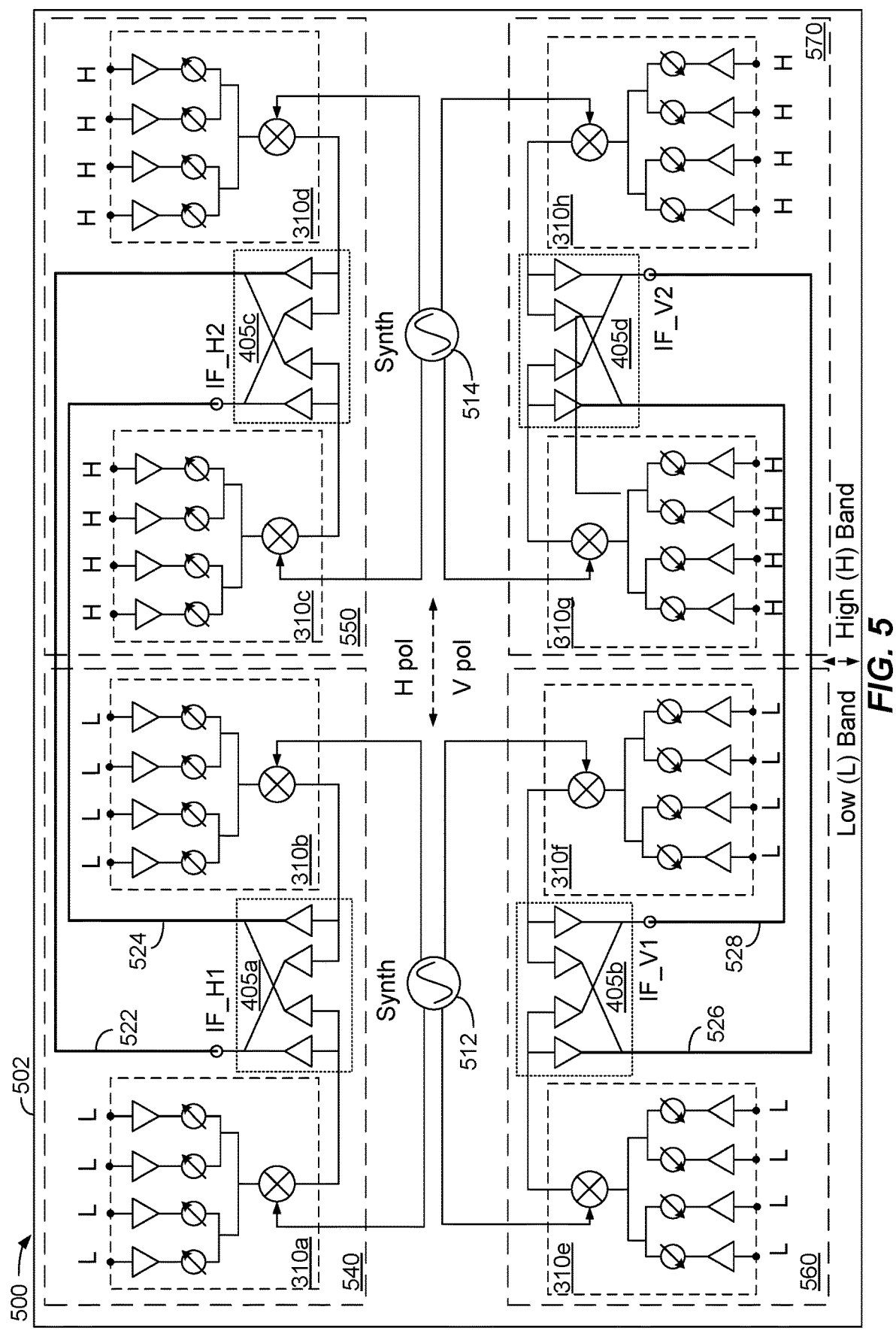
FIG. 5 shows a schematic diagram of an exemplary embodiment of a phased array.

FIG. 5 shows a schematic diagram 500 of a phased array 502. In an exemplary embodiment, the phased array 502 comprises eight (8) sub array structures 310, referred to as sub array structures 310a, 310b, 310c, 310d, 310e, 310f, 310g, and 310h in this example. In an exemplary embodiment, the sub array structures 310 may comprise an arrangement where the sub array structures 310c, 310d, 310g and 310h on the right hand side of the drawing are configured to process a signal in a particular band, such as high band, and the sub array structures 310a, 310b, 310e and 310f on the left hand side of the drawing are configured to process a signal in a particular band, such as low band. The terms "high" and "low" as used herein are relative. For example, a low band signal may have a frequency of approximately 24 GHz and a high band signal may have a frequency of approximately 39 GHz. Further, signals having frequencies lower than high band and higher than low band may also include what is referred to as mid-band (MB) signals. Other frequencies are possible with the frequencies of 24 GHz and 39 GHz used as example only. In some examples, the low band includes frequencies of approximately 24 GHz-30 GHz, and the high band includes frequencies of approximately 37 GHz-44 GHz or 48 GHz. Further, the upper sub array structures 310a, 310b, 310c and 310d may be configured to receive a horizontal polarization (H pol) signal from respective antennas (e.g., from 16 respective antennas in the illustrated example) and the lower sub array structures 310e, 310f, 310g and 310h may be configured to receive a vertical polarization (V pol) signal from the respective antennas (e.g., from the same antennas); however, this convention is arbitrary.

In an exemplary embodiment, the sub array structures 310a and 310b associated with low band, H pol may comprise a low band, H pol quadrant 540, the sub array structures 310c and 310d associated with high band, H pol may comprise a high band, H pol quadrant 550, the sub array structures 310e and 310f associated with low band, V pol may comprise a low band, V pol quadrant 560, and the sub array structures 310g and 310h associated with high band, V pol may comprise a high band, V pol quadrant 570. The quadrants 540, 550, 560 and 570 may also be referred to as sub array quadrants. Each of the quadrants 540, 550, 560 and 570 may be further divided into two sub-quadrants each having a sub array structure 310.

The phased array 502 also comprises a programmable diverting amplifier array (amplifier array) 405a coupled to sub array structures 310a and 310b; a programmable diverting amplifier array (amplifier array) 405b coupled to sub array structures 310e and 310f; a programmable diverting amplifier array (amplifier array) 405c coupled to sub array structures 310c and 310d; and a programmable diverting amplifier array (amplifier array) 405d coupled to sub array structures 310g and 310h.

A synthesizer 512 may be configured to provide a local oscillator (LO) signal to the mixers in the low band sub array structures 310a, 310b, 310e and 310f; and a synthesizer 514 may be configured to provide a local oscillator (LO) signal to the mixers in the high band sub array structures 310c, 310d, 310g and 310h. In some embodiments, the synthesizer 512 may be configured to provide a local oscillator (LO) signal to the high band sub array structures 310c, 310d, 310g and 310h; and/or the synthesizer 514 may be configured to provide a local oscillator (LO) signal to the low band sub array structures 310a, 310b, 310e and 310f.

In an exemplary embodiment, interconnect 522 may be used to connect the amplifier array 405c for the high band, H pol quadrant 550 to the low band IF port IF_H1 (illustrated as being in or near the low band, H pol quadrant 540 in this representation); and the interconnect 524 may be used to connect the amplifier array 405a for the low band, H pol quadrant 540 to the high band IF port IF_H2 (illustrated as being in or near the high band, H pol quadrant 550 in this representation). Similarly, interconnect 526 may be used to connect the amplifier array 405b for the low band, V pol quadrant 560 to the high band IF port IF_V2 (illustrated as being in or near the high band, V pol quadrant 570 in this representation); and the interconnect 528 may be used to connect the amplifier array 405d for the high band, V pol quadrant 570 to the low band IF port IF_V1 (illustrated as being in or near the low band, V pol quadrant 560 in this representation). In an exemplary embodiment, the interconnects 522, 524, 526 and 528 may be configured to carry intermediate frequency (IF) signals on the order of 10 GHz; however, other frequencies are possible. In an exemplary embodiment, the interconnects 522, 524, 526 and 528 allow a signal received and processed at a first quadrant to be transferred to an IF port coupled to a second quadrant. For example, a signal received at the sub array structure 310a or 310b on the low band, H pol quadrant 540 may be processed by the amplifier array 405a and then provided over the interconnect 524 to the high band IF port IF_H2. Similarly, a signal received at the sub array structure 310c or 310d on the high band, H pol quadrant 550 may be processed by the amplifier array 405c and then provided over the interconnect 522 to the low band IF port IF_H1. Similarly, a signal received at the sub array structure 310e or 310f on the low band, V pol quadrant 560 may be processed by the amplifier array 405b and then provided over the interconnect 526 to the high band IF port IF_V2. Similarly, a signal received at the sub array structure 310g or 310h on the high band, V pol quadrant 570 may be processed by the amplifier array 405d and then provided over the interconnect 528 to the low band IF port IF_V1.

In an exemplary embodiment, the components of the phased array 502 are configured to implement a split antenna array and may be configured to realize independent beam management (IBM) for inter-band carrier aggregation (CA) and 4×4 multiple input multiple output (MIMO) signal processing. For example, the phased array 502 may be configured such that RF communication signals may be received and processed by some or all of the antenna ports on the sub array structures 310 by selectively enabling one or more of the LNAs and phase shifters on the sub array structures 310. For example, signals from two antenna ports of a sub array structure 310 may be selectively processed and routed independent of signals from two other antenna ports of the sub array structure 310.

In an exemplary embodiment, switching circuitry (not shown) may be configured to allow a single interconnect between the amplifier array 405a on the low band, H pol quadrant 540 and the amplifier array 405c on the high band, H pol quadrant 550. Similarly, switching circuitry (not shown) may be configured to allow a single interconnect between the amplifier array 405b on the low band, V pol quadrant 560 and the amplifier array 405d on the high band, V pol quadrant 570. In this manner, the interconnects 522 and 524 may be combined into a single interconnect and the interconnects 526 and 528 may be combined into a single interconnect.

It will be understood that the IF ports described herein are examples, and that the ports may instead be ports for other frequencies. For example, they may be baseband ports in a direct conversion system. The IF (or other frequency) ports may comprise an output of the phased array 502. For example, the ports may each be coupled to (or implemented as) a respective pin of an IC on which the phased array 502 is implemented. In configurations in which the IC is included in a module, the ports or pins may be coupled to a connector configured to convey signals between the module and other components of the device 200 or 200a.

In an exemplary embodiment, one or more signals may be received by one or more antenna elements and may be downconverted from RF to IF and may be present on the ports, IF_H1, IF_H2, IF_V1, and/or IF_V2. The signals on these ports may be conveyed over a cable or other connection to a transceiver chip or other circuitry for further processing the one or more signals, for example optionally the downconverter 260 (e.g., when IF is used, as in this example, but the downconverter 260 may be omitted in direct conversion architectures) and the amplifiers and/or filters 262, 264. After being processed by these elements, the data processor 210 may receive the signals and further process them to extract information regarding wireless communications.

FIG. 5 is described as having four quadrants. In other examples, however, there may not be four such quadrants. For example, in implementations where certain antennas do not include both a V and an H pol, there may be less than four quadrants (e.g., just the upper half of FIG. 5 may be implemented). Other configurations in which less (or more) than four quadrants are implemented may be used. Further, while the quadrants are illustrated as being distributed in four corners of a rectangle, such representation is not limiting. The quadrants may be arranged on a chip in any number of manners. They may be linearly arranged, and they may be separated as shown, or may overlap. While certain description below recites quadrants, a "grouping" having multiple (e.g., a pair of) sub array structures may also be used to describe illustrated circuitry, such as any of 540, 550, 560, and 570.

Figure 6:
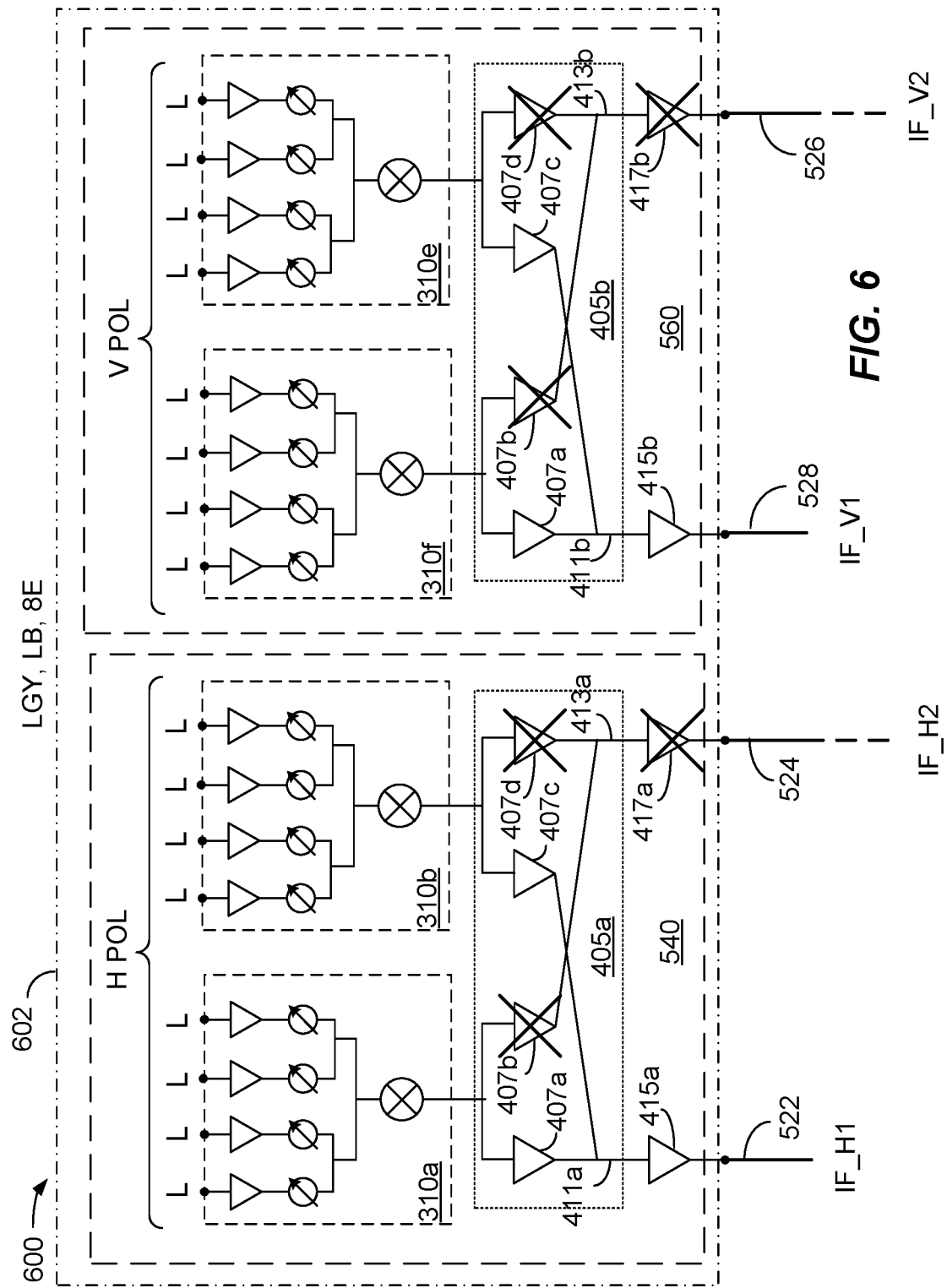
FIG. 6 shows a schematic diagram of a portion of an exemplary embodiment of a phased array.

FIG. 6 shows a schematic diagram 600 of a portion of a phased array 602. The portion of the phased array 602 shows only the low band circuity of the phased array 502 of FIG. 5 comprising low band H pol quadrant 540 and low band, V pol quadrant 560, including exemplary amplifier arrays 405a and 405b. The portion of the phased array 602 shown in FIG. 6 may be configured to perform legacy (LGY) and low band (LB) operation. The configuration shown in FIG. 6 comprises amplifiers 407a and amplifiers 407c in the amplifier array 405a and the amplifier array 405b being active and amplifiers 407b and amplifiers 407d in the amplifier array 405a and the amplifier array 405b being disabled. Further, amplifiers 415a and 415b are active and amplifiers 417a and 417b are disabled in this exemplary embodiment. This arrangement results in receive signals from the sub array structures 310a and 310b appearing at the port IF_H1 and signals from the sub array structures 310f and 310e at the port IF_V1. In an exemplary embodiment, the amplifier array 405a combines the signals from the sub arrays 310a and 310b in the low band H pol quadrant 540; and the amplifier array 405b combines the signals from the sub arrays 310e and 310f in the low band H pol quadrant 560, resulting in signals from horizontal and vertical polarizations from up to eight antenna elements (H pol and V pol), all LB in this example, being provided to the ports IF_H1 and IF_V1, in this example. In other examples, signals may be routed to IF_H2 and/or IF_V2.

Figure 7:
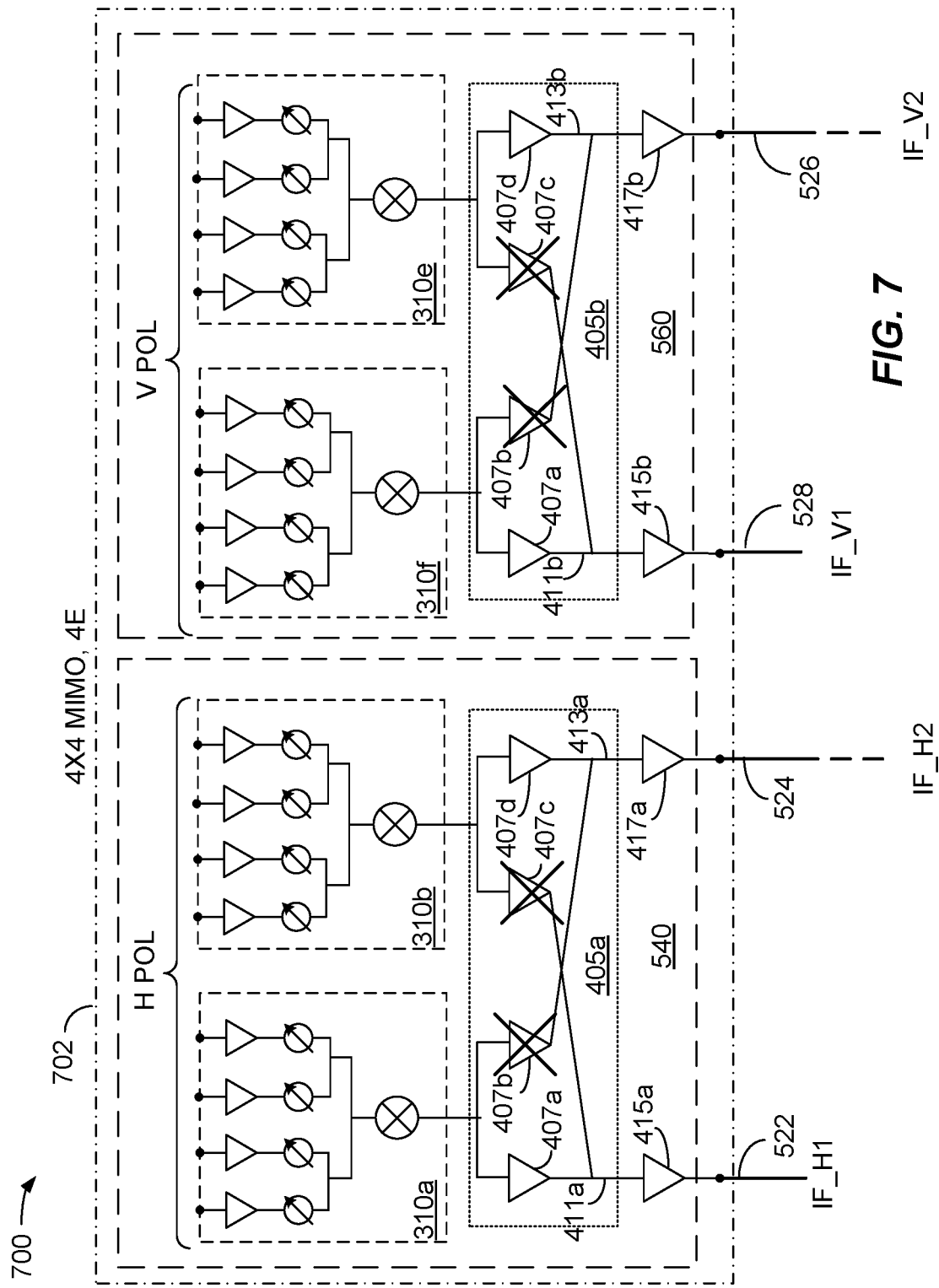
FIG. 7 shows a schematic diagram of a portion of an exemplary embodiment of a phased array.

FIG. 7 shows a schematic diagram 700 of a portion of an exemplary embodiment of a phased array 702. The portion of the phased array 702 shows only the low band circuity comprising low band H pol quadrant 540 and low band, V pol quadrant 560, including exemplary amplifier arrays 405a and 405b. The portion of the phased array 702 shown in FIG. 7 may be configured to perform 4×4 MIMO operation up to 4E, that is using four antenna elements. In the example shown in FIG. 7, fewer than all of the LNAs and phase shifters may be enabled in the sub array structures 310a, 310b, 310e and 310f, with two exemplary LNAs and phase shifters being enabled in an exemplary embodiment in each of the sub array structures 310a, 310b, 310e and 310f. In other exemplary embodiments, one to four of the LNAs and phase shifters may be enabled in each sub array 310.

The configuration shown in FIG. 7 comprises amplifier 407a and amplifier 407d in the amplifier array 405a and the amplifier array 405b being active and amplifier 407b and amplifier 407c in the amplifier array 405a and the amplifier array 405b being disabled. Further, amplifiers 415a and 415b are active and amplifiers 417a and 417b are active in this exemplary embodiment. This arrangement results in receive signals appearing at the port IF_H1, the port IF_H2, the port IF_V1, and the port IF_V2. In an exemplary embodiment each sub array 310a, 310b, 310f and 310e receives a radio frequency signal and performs dedicated and independent phase shifting for each receive signal and each receive signal is down-converted to separate IF paths and sent to a corresponding IF port. In this exemplary embodiment, each of the IF ports IF_H1, IF_H2, IF_V1, and IF_V2 carries a signal with a different phase angle. In other exemplary embodiment, the same frequency LO signal can be provided to all mixers, or different frequency signals can be provided to different mixers. For example, a first LO signal having a first frequency may be provided by the synthesizer 512 to the mixers in the sub arrays 310*a* and 310*f* and a second LO signal having a second frequency may be provided by the synthesizer 514 to the mixers in the sub arrays 310*b* and 310*e* such that two different IF signals appear on IF ports IF_H1 and IF_V1, and on ports IF_H2 and IF_V2. Any of the synthesizers 512 and 514 can provide an LO signal to any of the mixers in any of the sub arrays 310.

Figure 8:
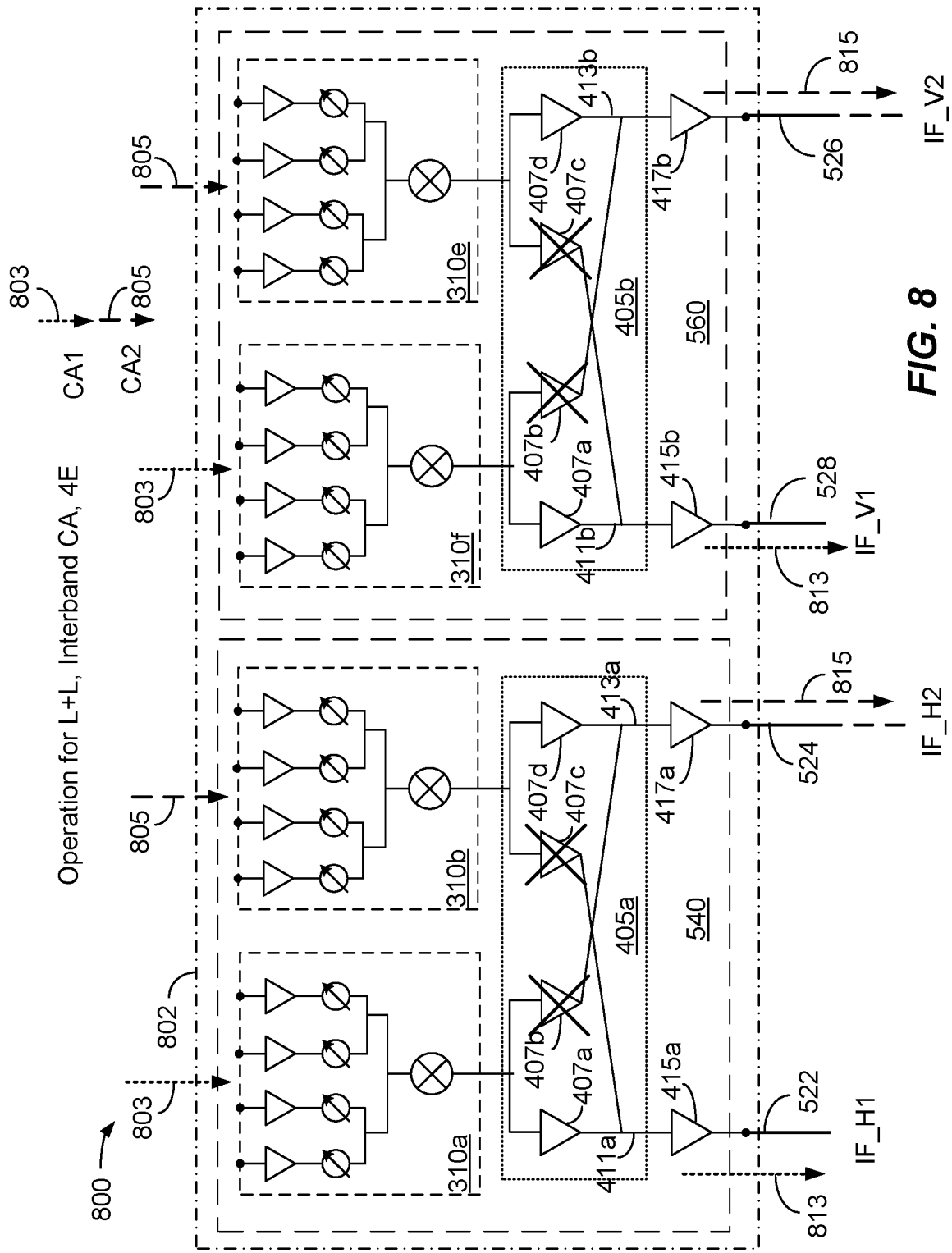
FIG. 8 shows a schematic diagram of a portion of an exemplary embodiment of a phased array.

FIG. 8 shows a schematic diagram 800 of a portion of an exemplary embodiment of a phased array 802. The portion of the phased array 802 shows only the low band circuity comprising low band H pol quadrant 540 and low band, V pol quadrant 560, including exemplary amplifier arrays 405*a* and 405*b*. The components in this example that process a first communication signal at a first frequency are arbitrarily illustrated as being adjacent an arrow with bold dotted lines and the components in this example that process a second communication signal at a second frequency are arbitrarily illustrated as being adjacent an arrow with bold dashed lines. In an exemplary embodiment, a first communication signal at a first frequency (f1) (CA1) is shown using the arrow 803 and a second communication signal at a second frequency (f2) (CA2) is shown using the arrow 805. In an exemplary embodiment, the signals represented by the arrows 803 and 805 may be low band signals at different frequencies in this example for performing interband carrier aggregation. However, other frequencies, including medium or high band may also be processed. The portion of the phased array 802 shown in FIG. 8 may be configured to perform low band+ low band (L+L) interband carrier aggregation up to 4E. The configuration shown in FIG. 8 comprises amplifiers 407*a* and amplifiers 407*d* in the amplifier array 405*a* and the amplifier array 405*b* being active and amplifiers 407*b* and amplifiers 407*c* in the amplifier array 405*a* and the amplifier array 405*b* being disabled. Further, amplifiers 415*a* and 415*b* are active and amplifiers 417*a* and 417*b* are active in this exemplary embodiment. This arrangement results in receive signals appearing at the port IF_H1, the port IF_H2, the port IF_V1, and the port IF_V2. In an exemplary embodiment, the subarray 310*a* and the sub array 310*f* receive and process the first communication signal at the first frequency (f1) (CA1), shown using the arrow 803 and the subarray 310*b* and the sub array 310*e* receive and process the second communication signal at the second frequency (f2) (CA2), shown using the arrow 805. In this example, each of the sub arrays 310*a*, 310*b*, 310*e* and 310*f* may have one through four LNAs and phase shifters enabled. In an exemplary embodiment each sub array 310*a*, 310*b*, 310*f* and 310*e* performs dedicated and independent phase shifting for each receive signal and each receive signal is down-converted to separate IF paths and sent to corresponding IF ports. In an exemplary embodiment, the RF signals represented by arrows 803 and 805 may be down-converted by the mixers in the sub array structures to corresponding IF signals indicated by arrows 813 at ports IF_H1 and IF_V1, and 815 at ports IF_H2 and IF_V2. In this exemplary embodiment, each of the IF ports IF_H1, IF_H2, IF_V1 and IF_V2 carries a signal with a different phase angle. As mentioned herein, any of the synthesizers 512 and 514 can provide an LO signal to any of the sub arrays 310.

In the example shown in FIG. 8, a first IF signal 813 corresponding to a first carrier-aggregation signal 803 at the first frequency (f1) (CA1) may appear at ports IF_H1 and IF_V1, and a second IF signal 815 corresponding to a second carrier-aggregation signal 805 at the second frequency (f2) (CA2) may appear at ports IF_H2 and IF_V2. In an exemplary embodiment, each sub array 310*a*, 310*b*, 310*f* and 310*e* may carry a different signal with different frequencies. Each of the signals is down-converted to separate IF paths and sent to a port with the different frequencies as shown for CA1 and CA2. Each path, CA1 and CA2 allows independent beam management (IBM) with independent phase shift. CA signals from the ports may be further processed (e.g., so as to aggregate the information in the carrier aggregated signals) by other circuitry in the device 200 or 200*a*, for example by the data processor 210.

Signals were routed to "straight through" to respective ports using amplifiers 407*a* and 407*d* in the examples of FIGS. 7 and 8. In other examples, the signals in either amplifier array 405*a*, 405*b* may be "crossed" by instead enabling the amplifiers 407*b* and 407*c*.

Figure 9:
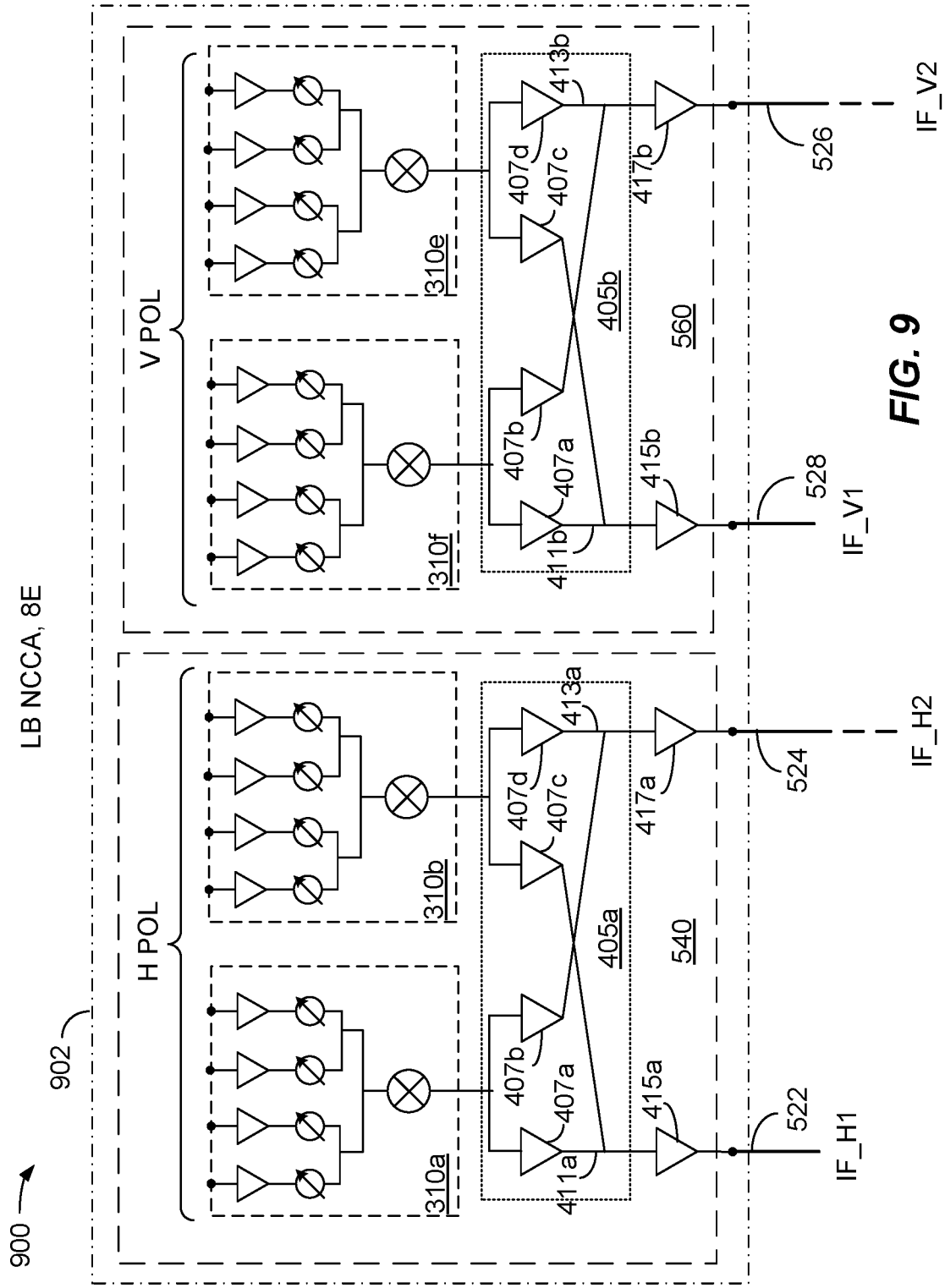
FIG. 9 shows a schematic diagram of a portion of an exemplary embodiment of a phased array.

FIG. 9 shows a schematic diagram 900 of a portion of an exemplary embodiment of a phased array 902. The portion of the phased array 902 shows only the low band circuity comprising low band H pol quadrant 540 and low band, V pol quadrant 560, including exemplary amplifier arrays 405*a* and 405*b*. The portion of the phased array 902 shown in FIG. 9 may be configured to perform low band, non-contiguous carrier aggregation (NCCA) up to 8E. The configuration shown in FIG. 9 comprises amplifiers 407*a*, 407*b*, 407*c* and 407*d* in the amplifier array 405*a* being active and amplifiers 407*a*, 407*b*, 407*c* and 407*d* in the amplifier array 405*b* being active. Further, amplifiers 415*a* and 415*b* are active and amplifiers 417*a* and 417*b* are active in this exemplary embodiment. This arrangement results in receive signals appearing at the port IF_H1, the port IF_H2, the port IF_V1, and the port IF_V2.

In the example shown in FIG. 9. receive signals may be processed by the sub arrays 310*a*, 310*b*, 310*e* and 310*f* and the amplifier circuits 405*a* and 405*b* and may appear at the ports IF_H1, IF_H2, IF_V1 and IF_V2. In an exemplary embodiment, in NCCA 8E mode in which all amplifiers 407, 415 and 417 are ON, each IF port IF_H1, IF_H2, IF_V1 and IF_V2 contains a signal from at least one of eight (8) antenna elements of that corresponding horizontal or vertical polarization. In this exemplary embodiment, the same frequency LO signal may be provided to all of the mixers in the sub arrays 310*a*, 310*b*, 310*e* and 310*f*.

Examples are provided above using low band groupings of sub array structures. It will be understood that high band groupings of sub array structures may alternatively or additionally be configured or operated in a similar manner.

Figure 10:
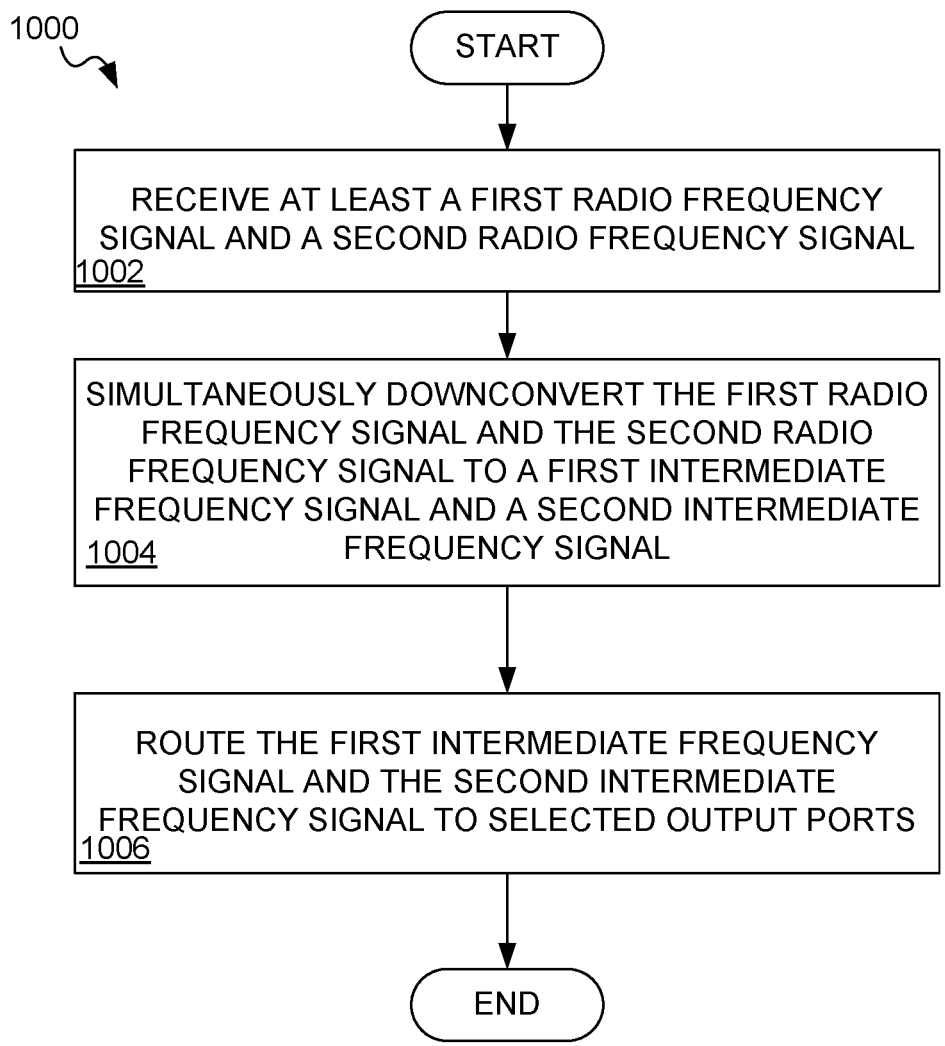
FIG. 10 is a flow chart describing an example of the operation of a method for signal processing.

FIG. 10 is a flow chart describing an example of the operation of a method 1000 for signal processing. The blocks in the method 1000 can be performed in or out of the order shown, and in some embodiments, can be performed at least in part in parallel.

In block 1002, a first radio frequency (RF) signal and a second RF signal are received at an RF receiver. For example, a first RF signal 803 may be received at the sub array structure 310*a* on the low band, H pol quadrant 540 and by the subarray structure 310*f* on the low band, V pol quadrant 560; and a second RF signal 805 may be received at the sub array structure 310*b* on the low band, H pol quadrant 540 and by the subarray structure 310*e* on the low band, V pol quadrant 560.

In block 1004, the first RF signal and the second RF signal are simultaneously downconverted to a first intermediate frequency (IF) signal and a second IF signal. For example, the mixer in the sub array structure 310*a* and the mixer in the subarray structure 310*f* can downconvert the first RF signal 803 to a first IF signal 813; and the mixer in the sub array structure 310*b* and the mixer in the subarray structure 310*e* can downconvert the second RF signal 805 to a second IF signal 815.

In block 1006, the first IF signal and the second IF signal are routed to selected output ports. For example, the first IF signal 813 may be routed to the low band IF port IF_H1 and to the low band IF port IF_V1; and the second IF signal 815 may be routed to the high band IF port IF_H2 and to the high band IF port IF_V2.

Figure 11:
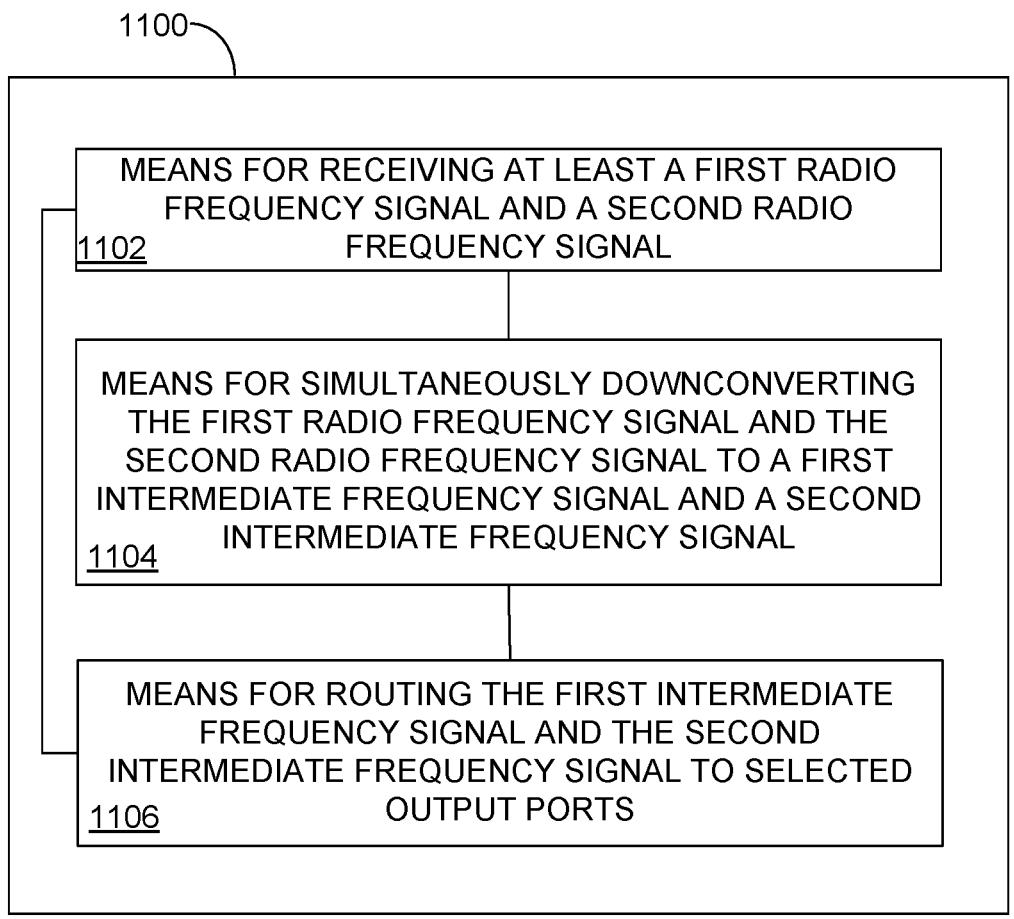
FIG. 11 is a functional block diagram of an apparatus for signal processing.

FIG. 11 is a functional block diagram of an apparatus for signal processing. The apparatus 1100 comprises means 1102 for receiving a first radio frequency (RF) signal and a second RF signal. In certain embodiments, the means 1102 for receiving a first RF signal and a second RF signal can be configured to perform one or more of the functions described in operation block 1002 of method 1000 (FIG. 10). In an exemplary embodiment, the means 1102 for receiving a first RF signal and a second RF signal may comprise the sub array structure 310*a* on the low band, H pol quadrant 540 and the subarray structure 310*f* on the low band, V pol quadrant 560 configured to receive a first RF signal 803; and the sub array structure 310*b* on the low band, H pol quadrant 540 and the subarray structure 310*e* on the low band, V pol quadrant 560 configured to receive a second RF signal 805.

The apparatus 1100 may also comprise means 1104 for simultaneously downconverting the first RF signal and the second RF signal to a first intermediate frequency (IF) signal and a second IF signal. In certain embodiments, the means 1104 for simultaneously downconverting the first RF signal and the second RF signal to a first IF signal and a second IF signal can be configured to perform one or more of the functions described in operation block 1004 of method 1000 (FIG. 10). In an exemplary embodiment, the means 1104 for simultaneously downconverting the first RF signal and the second RF signal to a first intermediate frequency (IF) signal and a second IF signal may comprise the mixer (330) in the sub array structure 310*a* and the mixer (330) in the subarray structure 310*f* configured to downconvert the first RF signal 803 to a first IF signal 813; and the mixer (330) in the sub array structure 310*b* and the mixer (330) in the subarray structure 310*e* configured to downconvert the second RF signal 805 to a second IF signal 815.

The apparatus 1100 may also comprise means 1106 for routing the first IF signal and the second IF signal to selected output ports. In certain embodiments, the means 1106 for routing the first IF signal and the second IF signal to a selected output port can be configured to perform one or more of the functions described in operation block 1006 of method 1000 (FIG. 10). In an exemplary embodiment, the means 1106 for routing the first IF signal and the second IF signal to a selected output port may comprise one or more of the amplifier circuits 405 configured to route the first IF signal 813 to the low band IF port IF_H1 via interconnect 522 and to the low band IF port IF_V1 via interconnect 528; and may comprise one or more of the amplifier circuits 405 configured to route the second IF signal 815 to the high band IF port IF_H2 via interconnect 524 and to the high band IF port IF_V2 via interconnect 526.

Figure 12:
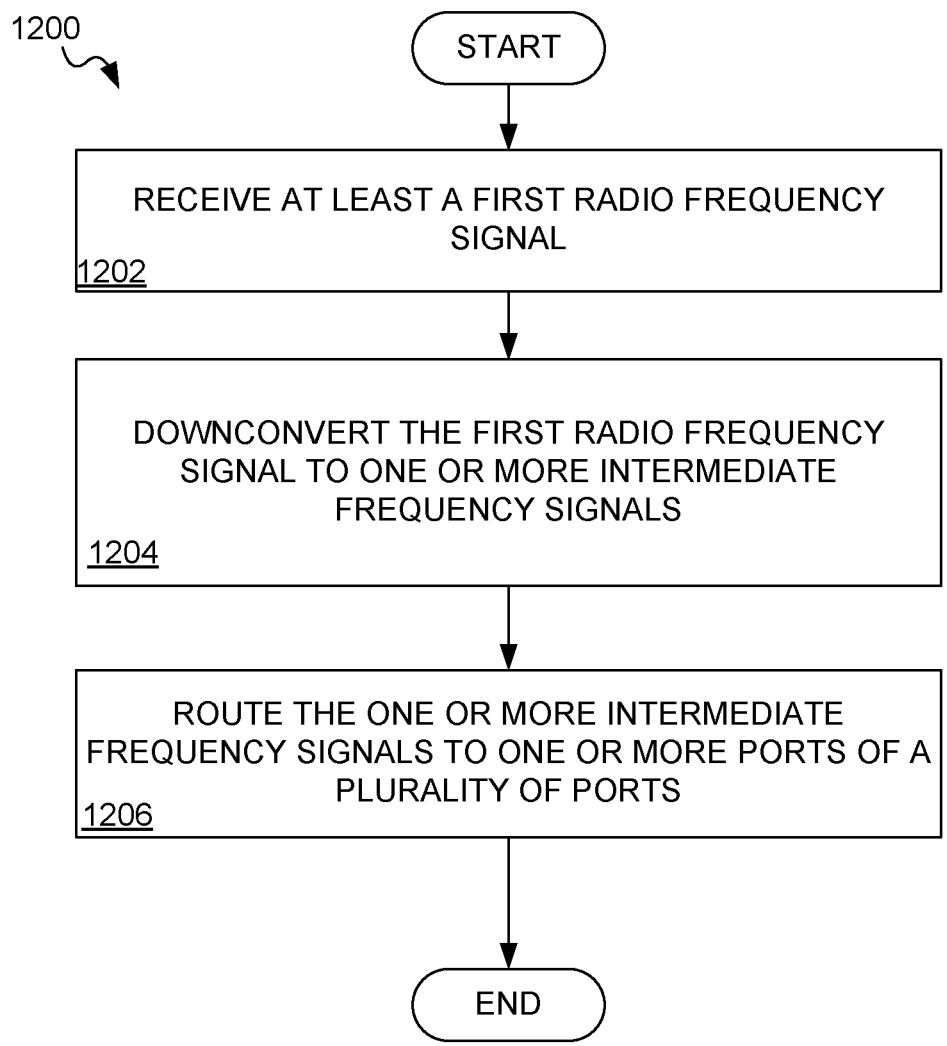
FIG. 12 is a flow chart describing an example of the operation of a method for signal processing.

FIG. 12 is a flow chart describing an example of the operation of a method 1200 for signal processing. The blocks in the method 1200 can be performed in or out of the order shown, and, in some embodiments, can be performed at least in part in parallel.

In block 1202, a first radio frequency (RF) signal is received at an RF receiver. For example, a first RF signal may be received at the sub array structures 310*a* and 310*b* on the low band, H pol quadrant 540, and the sub array structures 310*e* and 310*f* on the low band, V pol quadrant 560.

In block 1204, the first RF signal is downconverted to one or more intermediate frequency (IF1) signals. For example, the sub arrays 310*a*, 310*b*, 310*e* and 310*f* can downconvert the RF signal to one or more IF signals.

In block 1206, the one or more IF signal are routed to one or more ports of a plurality of ports. For example, one or more of the amplifier circuits 405 may route the one or more IF signals to one or more of the ports IF_H1, IF_H2, IF_V1 and IF_V2.

Figure 13:
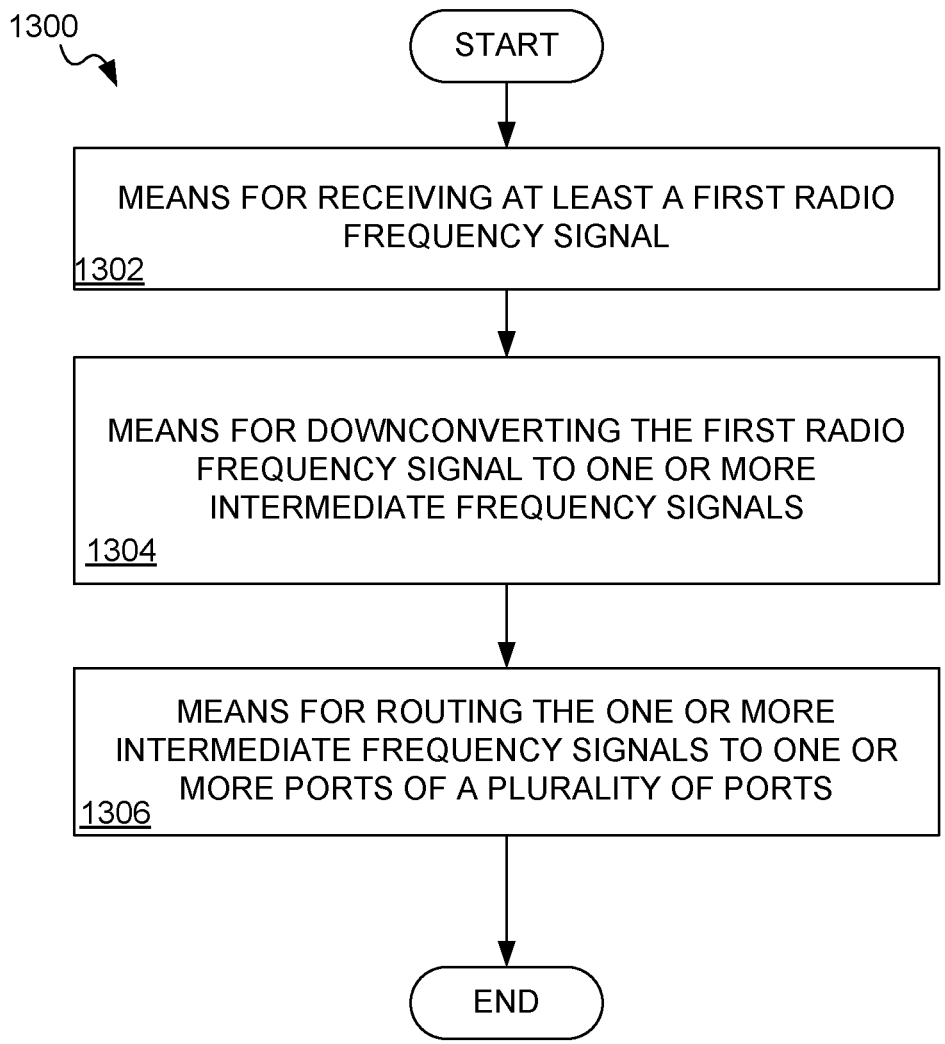
FIG. 13 is a functional block diagram of an apparatus for signal processing.

FIG. 13 is a functional block diagram of an apparatus for signal processing. The apparatus 1300 comprises means 1302 for receiving at least a first radio frequency (RF) signal. In certain embodiments, the means 1302 for receiving at least a first RF signal can be configured to perform one or more of the functions described in operation block 1202 of method 1200 (FIG. 12). In an exemplary embodiment, the means 1302 for receiving at least a first RF signal may comprise the sub array structures 310*a* and 310*b* on the low band, H pol quadrant 540 and the subarray structures 310*e* and 310*f* on the low band, V pol quadrant 560 configured to receive a first RF signal.

The apparatus 1300 may also comprise means 1304 for downconverting the at least first RF signal to one or more first intermediate frequency (IF) signals. In certain embodiments, the means 1304 for downconverting the at least first RF signal to one or more IF signals can be configured to perform one or more of the functions described in operation block 1204 of method 1200 (FIG. 12). In an exemplary embodiment, the means 1304 for downconverting the at least first RF signal to one or more intermediate frequency (IF) signals may comprise the mixers (330) in the sub array structures 310*a*, 310*b*, 310*e* and 310*f* configured to downconvert the at least first RF signal to one or more IF signals.

The apparatus 1300 may also comprise means 1306 for routing the one or more IF signals to one or more output ports of a plurality of output ports. In certain embodiments, the means 1306 for routing the one or more IF signals to one or more output ports can be configured to perform one or more of the functions described in operation block 1206 of method 1200 (FIG. 12). In an exemplary embodiment, the means 1306 for routing the one or more IF signals to one or more output ports may comprise one or more of the amplifier circuits 405 configured to route the one or more IF signals to one or more of the ports IF_H1, IF_H2, IF_V1 and IF_V2 via one or more of the interconnects 522, 524, 526 and 528.

Implementation examples are described in the following numbered clauses:

1. A receive system for performing carrier aggregation (CA) and multiple input multiple output (MIMO) operation at millimeter wave (mmW) frequencies, comprising: a phased array having a plurality of groupings, each grouping having a pair of sub array structures, each sub array structure having a mixer and a plurality of phased array elements, each phased array element associated with an antenna element, each phased array element having an amplifier (LNA) and phase shift circuitry; and an amplifier array associated with each grouping, the amplifier array having two pairs of amplifiers, wherein a first amplifier of each pair is coupled to a first port and a second amplifier of each pair is coupled to a second port, the amplifier array configured to selectively route an output from any of the sub array structures of a grouping to either of the first and second ports.

2. The system of clause 1, further comprising intermediate frequency (IF) interconnects between selected amplifier arrays associated with each of the groupings.

3. The system of clause 2, wherein the intermediate frequency (IF) interconnects allow a signal received at a first grouping to be transferred to a second grouping.

4. The system of clause 2, wherein the intermediate frequency (IF) interconnects allow independent beam management (IBM).

5. The system of any of clause 1-4, wherein the system is configured to realize independent beamforming (IBF) for interband carrier aggregation (CA) and 4×4 multiple input multiple output (MIMO) signal processing.

6. The system of any of clauses 1-5, wherein the receive system allows a plurality of radio frequency (RF) signals to be independently phase shifted and downconverted to a corresponding plurality of IF signals.

7. The system of clause 6, wherein the plurality of RF signals have different frequencies.

8. A method for signal processing, comprising: receiving at least one radio frequency (RF) signal at a receiver; downconverting the at least one RF signal to one or more intermediate frequency (IF) signals; and selectively routing the one or more IF signals to selected output ports.

9. The method of clause 8, further comprising selectively routing the one or more IF signals between selected amplifier arrays associated with each of a plurality of sub array quadrants.

10. The method of clause 9, further comprising selectively routing an IF signal received at a first sub array quadrant to a second sub array quadrant.

11. The method of any of clauses 8-10, further comprising selectively amplifying and phase shifting the at least one RF signal.

12. The method of any of clauses 8-11, wherein the at least one RF signal comprises two RF signals having different frequencies.

13. A device, comprising: means for receiving at least one radio frequency (RF) signal at a receiver; means for downconverting the at least one RF signal to one or more intermediate frequency (IF) signals; and means for selectively routing the one or more IF signals to selected output ports.

14. The device of clause 13, further comprising means for selectively routing the one or more IF signals between selected amplifier arrays associated with each of a plurality of sub array quadrants.

15. The device of any of clauses 13 or 14, further comprising means for selectively routing an IF signal received at a first sub array quadrant to a second sub array quadrant.

16. The device of clauses 13-15, further comprising means for receiving at least two RF signals and selectively amplifying and phase shifting the at least two RF signals.

17. A radio system architecture, comprising: a receiver having multiple sub arrays in a phased array, the multiple sub arrays configured to perform carrier aggregation (CA) and multiple input multiple output (MIMO) signal processing, the receiver configured to downconvert at least one radio frequency (RF) signal to one or more intermediate frequency (IF) signals; and one or more amplifier arrays configured to selectively route the one or more IF signals to selected output ports.

18. The radio system architecture of clause 17, further comprising intermediate frequency (IF) interconnects between selected amplifier arrays associated with each of the multiple sub arrays.

19. The radio system architecture of clause 18, wherein the intermediate frequency (IF) interconnects allow a signal received at a first sub array to be routed to an output port associated with a second sub array.

20. The radio system architecture of any of clauses 17-19, wherein the radio system architecture allows a plurality of radio frequency (RF) signals to be independently phase shifted and downconverted to a corresponding plurality of IF signals.

21. The radio system architecture of clause 20, wherein the plurality of RF signals have different frequencies.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A receive system for performing carrier aggregation (CA) and multiple input multiple output (MIMO) operation at millimeter wave (mmW) frequencies, comprising:
a phased array having a plurality of groupings, each grouping having a pair of sub array structures, each sub array structure having a mixer and a plurality of phased array elements, each phased array element associated with an antenna element, each phased array element having an amplifier (LNA) and phase shift circuitry; and
an amplifier array associated with each grouping, the amplifier array having two pairs of amplifiers, wherein a first amplifier of each pair is coupled to a first port and a second amplifier of each pair is coupled to a second port, the amplifier array configured to selectively route an output from any of the sub array structures of a grouping to either of the first and second ports.

2. The system of claim 1, further comprising intermediate frequency (IF) interconnects between selected amplifier arrays associated with each of the groupings.

3. The system of claim 2, wherein the intermediate frequency (IF) interconnects allow a signal received at a first grouping to be transferred to a second grouping.

4. The system of claim 2, wherein the intermediate frequency (IF) interconnects allow independent beam management (IBM).

5. The system of claim 1, wherein the system is configured to realize independent beamforming (IBF) for interband carrier aggregation (CA) and 4×4 multiple input multiple output (MIMO) signal processing.

6. The system of claim 1, wherein the receive system allows a plurality of radio frequency (RF) signals to be independently phase shifted and downconverted to a corresponding plurality of IF signals.

7. The system of claim 6, wherein the plurality of RF signals have different frequencies.

8. A method for signal processing, comprising:
receiving at least one radio frequency (RF) signal at a receiver;
downconverting the at least one RF signal to one or more intermediate frequency (IF) signals;
selectively routing the one or more IF signals between selected amplifier arrays associated with each of a plurality of sub array quadrants; and
selectively routing the one or more IF signals to selected output ports.

9. The method of claim 8, further comprising selectively routing an IF signal received at a first sub array quadrant to a second sub array quadrant.

10. The method of claim 8, further comprising selectively amplifying and phase shifting the at least one RF signal.

11. The method of claim 8, wherein the at least one RF signal comprises two RF signals having different frequencies.

12. A device, comprising:
means for receiving at least one radio frequency (RF) signal at a receiver;
means for downconverting the at least one RF signal to one or more intermediate frequency (IF) signals;
means for selectively routing the one or more IF signals between selected amplifier arrays associated with each of a plurality of sub array quadrants; and
means for selectively routing the one or more IF signals to selected output ports.

13. The device of claim 12, further comprising means for selectively routing an IF signal received at a first sub array quadrant to a second sub array quadrant.

14. The device of claim 12, further comprising means for receiving at least two RF signals and selectively amplifying and phase shifting the at least two RF signals.

15. A radio system architecture, comprising:
a receiver having multiple sub arrays in a phased array, the multiple sub arrays configured to perform carrier aggregation (CA) and multiple input multiple output (MIMO) signal processing, the receiver configured to downconvert at least one radio frequency (RF) signal to one or more intermediate frequency (IF) signals; and
one or more amplifier arrays configured to selectively route the one or more IF signals to selected output ports.

16. The radio system architecture of claim 15, further comprising intermediate frequency (IF) interconnects between selected amplifier arrays associated with each of the multiple sub arrays.

17. The radio system architecture of claim 16, wherein the intermediate frequency (IF) interconnects allow a signal received at a first sub array to be routed to an output port associated with a second sub array.

18. The radio system architecture of claim 15, wherein the radio system architecture allows a plurality of radio frequency (RF) signals to be independently phase shifted and downconverted to a corresponding plurality of IF signals.

19. The radio system architecture of claim 18, wherein the plurality of RF signals have different frequencies.

* * * * *